E. W. STULL.
TROLLEY STAND.
APPLICATION FILED FEB. 13, 1908.

923,601.

Patented June 1, 1909.
2 SHEETS—SHEET 1.

Witnesses

Inventor
Emmett W. Stull
By
Chas. E. Lord
Attorney

E. W. STULL.
TROLLEY STAND.
APPLICATION FILED FEB. 13, 1908.
923,601.
Patented June 1, 1909.
2 SHEETS—SHEET 2.
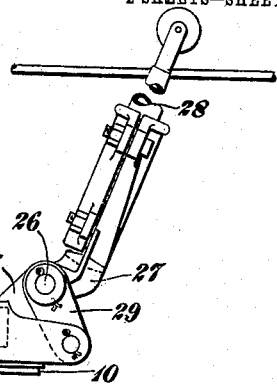
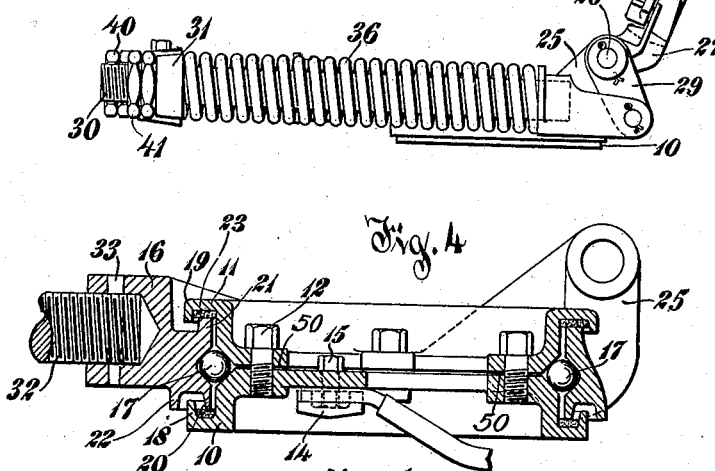
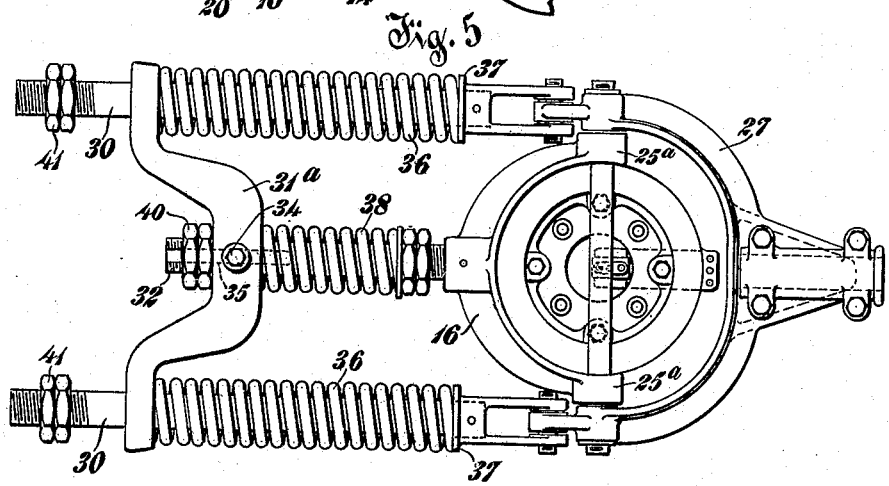
Witnesses
Oliver Thornman
Fred J. Kinsey
Inventor
Emmett W. Stull
By
Chas. E. Lord
Attorney

UNITED STATES PATENT OFFICE.

EMMETT W. STULL, OF NORWOOD, OHIO, ASSIGNOR TO ALLIS-CHALMERS COMPANY, A CORPORATION OF NEW JERSEY.

TROLLEY-STAND.

No. 923,601.  Specification of Letters Patent.  Patented June 1, 1909.

Application filed February 13, 1908.  Serial No. 415,666.

*To all whom it may concern:*

Be it known that I, EMMETT W. STULL, a citizen of the United States, residing at Norwood, in the county of Hamilton and State of Ohio, have invented certain new and useful Improvements in Trolley - Stands, of which the following is a full, clear, and exact specification.

My invention relates to trolleys for electric railway cars and especially to the stands or bases of such trolleys.

It is the object of my invention to provide an efficient and reliable trolley stand which will have a low structure, will cause the trolley to exert a substantially uniform upward pressure against the trolley wire for all working angles of the trolley pole, will have an easy movement around the vertical axis, and will be amply protected against breakage in case the trolley leaves the wire or other accidents occur.

The specific novel features of my invention will appear hereinafter and will be particularly pointed out in the claims.

Figure 1:
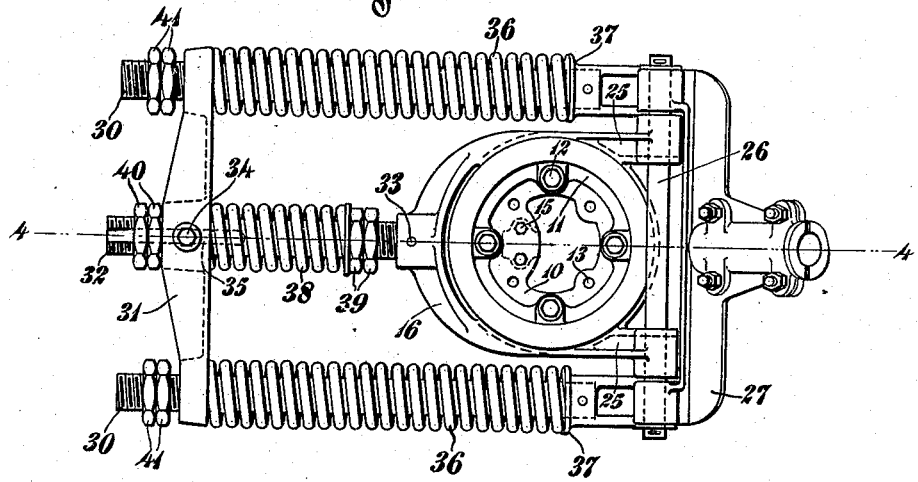
Figure 2:
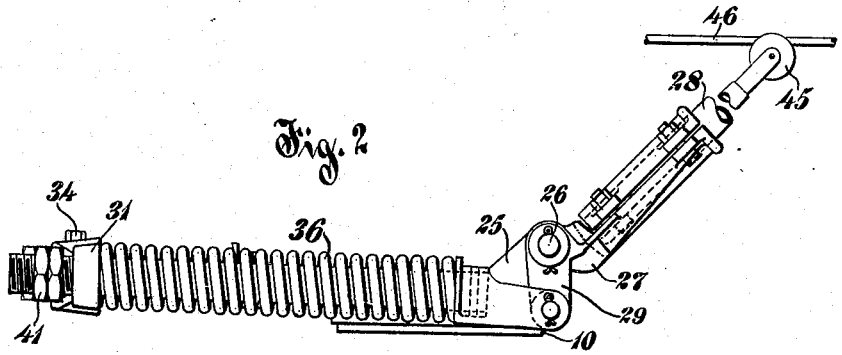

Figure 1 is a plan view of my improved trolley base; Fig. 2 is a side elevation thereof showing the position when the trolley is on the wire; Fig. 3 is a somewhat similar elevation showing the position when the trolley has jumped the wire; Fig. 4 is a section on the line 4—4 of Fig. 1; and Fig. 5 is a plan view of a slightly modified structure.

The inner and fixed member of the trolley stand comprises two parts 10 and 11, fastened together by bolts 12. The lower part 10 has holes 13, which alternate circumferentially with the bolts 12 and through which may extend screws or bolts for fastening the base to the top of the car. Beneath the central raised portion of the part 10 is attached by bolts 15 a clamp 14, which is arranged to receive the end of the cable which leads to the car circuits and to clamp it firmly against the lower side of the part 10.

The revoluble section 16 surrounds the fixed section and is supported thereon through a ball bearing 17, two sides of the race for which are in the section 16 and another side in each of the parts 10 and 11. Flanges 18 and 19 on the parts 10 and 11 extend outwardly and toward each other around flanges 20 and 21 of the section 15, thus forming in the part 10 a groove for catching any oil drippings from the bearings and in the part 11 overhanging eaves for preventing water from rain or other causes from getting into the bearing. Felt packing 23 may be placed in the grooves formed by the flanges 18 and 19 if desired. If desired another flange 22 on the section 16 may extend downward outside of the flange 18. Water will drain off at the right hand end of the revoluble section (Fig. 2). The section 16 is free to revolve around the fixed section 10 and 11 and will do so very easily. A number of thin shims 50 may be placed between the sections 10 and 11 to furnish means for adjusting the ball-bearing.

In the preferred modification shown in Figs. 1 to 4 inclusive, the revoluble section 16 has two rearwardly and upwardly extending lugs 25, one on each side. A rod 26 extends through bosses at the extremities of these lugs and projects beyond such lugs. Pivotally supported on the ends of the rod 26 is a yoke 27, the center of which is provided with a clamp for holding the trolley pole proper 28. From each side of the yoke 27 there is a downward extension 29, to the lower end of which is pivotally fastened a rod or pipe 30. The two rods 30 extend through the end of a cross-head 31. This cross-head 31 is supported on a rod or pipe 32, which is fastened in the revoluble section 16 on the side opposite the trolley pole 28. A pin 33 prevents the rod 32 from turning in the section 16, while a pin 34 engaging a slot 35 in the rod 32 prevents the cross-head 31 from turning on the rod 32 while permitting it to slide longitudinally thereof. Two compression springs 36 surround the rods 30 and bear against the cross-head 31 and the collars 37. A compression buffer spring 38 surrounds the rod 32 and bears against the cross-head 31 and the adjusting nuts 39. The strength of the springs 36 may be adjusted by nuts 40, while nuts 41 prevent too great an extension of the springs 36 and determine the point at which these springs cease and the buffer spring begins to act as hereinafter explained. The rods 30 and 32 are properly threaded to receive the various nuts.

In the operation of the trolley, when the parts are approximately as shown in Fig. 2, the springs 36, acting against the cross-head 31 and nuts 40, force the rods 30 and the extensions 29 to the right to hold the trolley wheel 45 against the trolley wire 46.

As the trolley wire rises and falls, the trolley wheel follows it, and the rods 30 slide freely through the cross-head 31 and the springs 36 are compressed more or less to maintain the pressure of the wheel against the wire. By proper determination of the angle between the extensions 29 and pole 28 and proper adjustment of the length and strength of the springs 36, a very uniform vertical pressure may be obtained between the trolley wheel and the trolley wire, and this pressure may be varied by the nuts 40. Should the trolley wheel 45 jump the wire 46, the springs 36, expanding, force the rods 30 to the right until the nuts 41 strike the cross-head 31. The springs 36 can now no longer expand, but the momentum of the moving parts may carry the trolley wheel farther forward and upward, and in this movement the cross-head 31 moves to the right against the spring 38, which thus acts as a buffer. The angle of the trolley pole at which the buffer spring begins to act may be adjusted by the nuts 41, while the strength of the buffer spring is adjusted by the nuts 39.

The modification shown in Fig. 5 is substantially the same in all essential parts as the modification above described, the main difference being that the lugs 25ª for supporting the yoke 27 do not extend backward but are so arranged that the horizontal axis about which the trolley pole moves and the vertical axis about which the revolving section 16 moves intersect. With this arrangement the cross-head 31ª is preferably bent as shown to allow the use of springs 36 and 38 of the same strength as before.

Many minor modifications in the precise arrangement shown and described may be made without departing from the spirit and scope of my invention and all such I aim to cover in the following claims.

What I claim as new is:—

1. In a trolley stand, the combination of a fixed section, a revoluble section supported thereon, a trolley arm hinged to said revoluble section, a cross-head normally fixed relatively to said revoluble section but movable relatively thereto upon movement of the trolley arm above a predetermined altitude, and compression springs between said cross-head and trolley arm.

2. In a trolley stand, the combination of a fixed section, a revoluble section supported thereon, a trolley arm hinged to said revoluble section, downward extensions from the base of said trolley arm, a cross-head normally fixed relatively to said revoluble section but movable relatively thereto upon movement of the trolley arm above a predetermined altitude, and compression springs between said cross-head and said downward extensions.

3. In a trolley stand, the combination of a fixed section, a revoluble section supported thereon, a trolley pole hinged to said revoluble section, a cross-head normally fixed relatively to the revoluble section but movable relatively thereto upon movement of the trolley pole above a predetermined altitude, rods pivoted to said trolley pole and extending through holes in said cross-head, and compression springs surrounding said rods and between said cross-head and collars on the rods.

4. In a trolley stand, the combination of a base, a trolley arm hinged to said base, a cross-head normally fixed relatively to said base but movable relatively thereto upon movement of the trolley arm above a predetermined altitude, and compression springs between said cross-head and trolley arm.

5. In a trolley stand, the combination of a base, a trolley arm hinged to said base, downward extensions from the lower end of said trolley arm, a cross-head normally fixed relatively to said base but movable relatively thereto upon movement of the trolley arm above a predetermined altitude, and compression springs between said cross-head and said downward extensions.

6. In a trolley stand, the combination of a base, a trolley pole hinged to said base, a cross-head normally fixed relatively to the base but movable relatively thereto upon movement of the trolley pole above a predetermined altitude, rods pivoted to said trolley pole and extending through holes in said cross-head, and compression springs surrounding said rods and bearing against said cross-head and collars on the rods.

7. In a trolley stand, the combination of a fixed section, a revoluble section mounted thereon, a trolley pole hinged to said revoluble section, a cross-head carried by said revoluble section, a buffer spring which presses said cross-head away from the revoluble section against a stop, a compression spring between said cross-head and the trolley pole, and a stop for preventing too great an extension of said last named spring.

8. In a trolley stand, a combination of a fixed section, a revoluble section mounted thereon, a trolley pole hinged to said revoluble section, springs for pressing said trolley pole upward, stops for limiting the action of such springs, and a buffer spring which comes into action only when the first mentioned springs have reached their limits.

9. In a trolley stand, the combination of a fixed section, a revoluble section mounted thereon, a trolley pole hinged to said revoluble section, a cross-head carried by said revoluble section and normally fixed relatively thereto, compression springs between said cross-head and the trolley pole for forcing the latter upward, stops for preventing too great an expansion of said springs, and a buffer spring for permitting a limited movement of said cross-head when the holding springs have expanded to bring said stops into action.

10. In a trolley stand, the combination of a fixed section, a revoluble section mounted thereon, a trolley arm hinged to said revoluble section, a cross-head carried by said revoluble section, rods slidable in said cross-head and pivoted to said trolley arm, compression springs surrounding said rods and acting against said cross-head to press the trolley arm upward, stops for limiting the movement of said rods with respect to said cross-head, and a buffer spring which permits limited movement of said cross-head when said stops engage it.

11. In a trolley stand, the combination of a base, a trolley pole hinged to said base, a cross-arm carried by said base, a buffer spring which presses said cross-head away from the base against a stop, a compression spring between said cross-head and the trolley pole, and a stop for preventing too great an extension of said last named spring.

12. In a trolley stand, the combination of a base, a trolley pole hinged to said base, springs for pressing said trolley pole upward, stops for limiting the action of such springs, and a buffer spring which comes into action only when the first mentioned springs have reached their limits.

13. In a trolley stand, the combination of a base, a trolley pole hinged to said base, a cross-head carried by said base and normally fixed relatively thereto, compression springs between said cross-head and the trolley pole for forcing the latter upward, stops for preventing too great an expansion of said springs, and a buffer spring for permitting a limited movement of said cross-head when the holding springs have expanded to bring said stops into action.

14. In a trolley stand, the combination of a base, a trolley pole hinged to said base, a cross-head carried by said base, rods slidable in said cross-head and pivoted to said trolley pole, springs surrounding said rods and acting against said cross-head to press the trolley pole upward, stops for limiting the movement of said rods with respect to said cross-head, and a buffer spring which permits limited movement of said cross-head when said stops engage it.

15. In a trolley stand, the combination of a pivoted base, a trolley pole hinged to said base, a spring for pressing said trolley pole upward, a stop for limiting the action of said spring, and a buffer spring which comes into action when the first mentioned spring has reached its limit.

In testimony whereof I affix my signature, in the presence of two witnesses.

EMMETT W. STULL.

Witnesses:
GEO. B. SCHLEY,
FRED J. KINSEY.